US012748910B2

(12) United States Patent
Deng et al.

(10) Patent No.: US 12,748,910 B2
(45) Date of Patent: Sep. 29, 2026

(54) SPECIAL CELL GENERAL DATABASE AND METHOD FOR ESTABLISHING THE SAME AND PATTERN CORRECTION METHOD

(71) Applicants: HUA HONG SEMICONDUCTOR (WUXI) LIMITED, Wuxi (CN); SHANGHAI HUAHONG GRACE SEMICONDUCTOR MANUFACTURING CORPORATION, Shanghai (CN)

(72) Inventors: Wanjun Deng, Wuxi (CN); Xiaoliang Jin, Shanghai (CN); Jiaji Feng, Shanghai (CN)

(73) Assignees: Hua Hong Semiconductor (Wuxi) Limited, Jiangsu (CN); Shanghai Huahong Grace Semiconductor Manufacturing Corporation, Shanghai (CN)

( * ) Notice: Subject to any disclaimer, the term of this patent is extended or adjusted under 35 U.S.C. 154(b) by 650 days.

(21) Appl. No.: 18/227,576

(22) Filed: Jul. 28, 2023

(65) Prior Publication Data

US 2024/0054275 A1 Feb. 15, 2024

(30) Foreign Application Priority Data

Aug. 11, 2022 (CN) ......................... 202210961900.7

(51) Int. Cl.
*G06F 30/00* (2020.01)
*G06F 30/398* (2020.01)
*G06F 111/20* (2020.01)

(52) U.S. Cl.
CPC ........ *G06F 30/398* (2020.01); *G06F 2111/20* (2020.01)

(58) Field of Classification Search
USPC ............ 716/50, 51, 52, 53, 54, 55, 100, 110
See application file for complete search history.

(56) References Cited

U.S. PATENT DOCUMENTS

2018/0173090 A1* 6/2018 Wang ........................ G03F 1/36

FOREIGN PATENT DOCUMENTS

CN 105223772 A 1/2016
CN 106980719 A 7/2017
(Continued)

OTHER PUBLICATIONS

Chinese Patent Office Action for Application No. 202210961900.7 dated Aug. 7, 2025 (19 pages, English Translation Included).

*Primary Examiner* — Brian Ngo
(74) *Attorney, Agent, or Firm* — Boyle Fredrickson S.C.

(57) ABSTRACT

The present disclosure discloses a special cell general database, a method for establishing the special cell general database and a pattern correction method. The pattern correction method includes: providing a to-be-corrected layout including a to-be-corrected region and a to-be-corrected special cell structure region; acquiring a to-be-corrected minimum repeating cell pattern in the to-be-corrected special cell structure region; providing a special cell general database; acquiring an information of a cell correction pattern corresponding to the to-be-corrected minimum repeating cell pattern in the special cell general database; performing an optical proximity correction on the to-be-corrected region to acquire an information of a second correction pattern; acquiring a correction layout according to the information of the second correction pattern and the information of the cell correction pattern. The present disclosure can improve a correction efficiency of the pattern correction method.

20 Claims, 12 Drawing Sheets

(56) References Cited

FOREIGN PATENT DOCUMENTS

| | | | | |
|---|---|---|---|---|
| CN | 107967401 A | 4/2018 | | |
| CN | 109031880 A | 12/2018 | | |
| CN | 111338180 A | 6/2020 | | |
| KR | 101686552 B1 * | 12/2016 | .......... | G06F 30/398 |

* cited by examiner

| | | | |
|---|---|---|---|
| 1 | 2 | 3 | 1 |
| 4 | 5 | 6 | 2 |
| 7 | 8 | 9 | 3 |

FIG. 15

| | | |
|---|---|---|
| 7 | 4 | 1 |
| 8 | 5 | 2 |
| 9 | 6 | 3 |
| 3 | 2 | 1 |

FIG. 16

| | | | |
|---|---|---|---|
| 3 | 9 | 8 | 7 |
| 2 | 6 | 5 | 4 |
| 1 | 3 | 2 | 1 |

FIG. 17

| | | |
|---|---|---|
| 1 | 2 | 3 |
| 3 | 6 | 9 |
| 2 | 5 | 8 |
| 1 | 4 | 7 |

FIG. 18

| | | | |
|---|---|---|---|
| 7 | 8 | 9 | 3 |
| 4 | 5 | 6 | 2 |
| 1 | 2 | 3 | 1 |

FIG. 19

| | | | |
|---|---|---|---|
| 1 | 3 | 2 | 1 |
| 2 | 6 | 5 | 4 |
| 3 | 9 | 8 | 7 |

FIG. 20

SPECIAL CELL GENERAL DATABASE AND METHOD FOR ESTABLISHING THE SAME AND PATTERN CORRECTION METHOD

CROSS-REFERENCE TO RELATED APPLICATIONS

This application claims the benefit of priority to Chinese patent application No. 202210961900.7, filed on Aug. 11, 2022, the entire disclosures of which are incorporated herein by reference.

TECHNICAL FIELD

The present disclosure relates to the technical field of semiconductors, and more particularly to a special cell general database, a method for establishing the special cell general database and a pattern correction method.

BACKGROUND OF THE INVENTION

Many design layouts have special cell structure regions, such as memory cells (SRAM), pixel cells (Pixel), etc. For process platforms of different nodes, the types of special cell structures designed by the company are limited. As chip size increases, the number of repeating structures at different positions within a special cell increases. Therefore, in the process of optical proximity correction (OPC), a calculation amount of special cell regions is also large, which results in repeat calculation of optical proximity correction results for the same special cell structure under different products, and causes partial waste of optical proximity correction resources. Moreover, problems often arise with the optical proximity correction results in the special cell regions, which takes time and energy troubleshooting the problems for optical proximity correction personnel.

In order to perform optical proximity correction better, it is necessary to identify and classify the special cell regions.

SUMMARY OF THE INVENTION

The embodiments of the present disclosure provide a special cell general database, a method for establishing the special cell general database and a pattern correction method, in order to improve the working efficiency of the optical proximity correction.

According to an aspect of the present disclosure, a method for establishing a special cell general database for pattern correction includes: providing a design layout including a plurality of special cell structure regions, wherein the plurality of special cell structure regions include a plurality of patterns; acquiring a minimum repeating cell pattern in the plurality of special cell structure regions; establishing a special cell structure database according to an information of the minimum repeating cell pattern; acquiring a first correction layout by correcting the design layout, wherein the first correction layout has a cell correction pattern corresponding to the minimum repeating cell pattern; establishing a special cell correction result database according to an information of the cell correction pattern; and establishing the special cell general database according to the special cell structure database and the special cell correction result database, wherein the information of each minimum repeating cell pattern is in one-to-one correspondence with the information of each cell correction pattern in the special cell general database.

According to some embodiments, acquiring a minimum repeating cell pattern in the plurality of special cell structure regions includes: selecting a feature pattern according to a preset condition; acquiring a feature vector of the feature pattern according to the feature pattern; acquiring a pattern conforming to the feature vector in the design layout according to the feature vector; and taking any one end point of a side of the feature pattern as a first vertex, and extending a preset length along a first direction and a second direction perpendicular to each other to acquire a minimum repeating cell region, wherein the minimum repeating cell region has a rectangle shape, and a pattern in the minimum repeating cell region is the minimum repeating cell pattern.

According to some embodiments, the preset condition includes: a number of sides of the feature pattern is greater than or equal to 6.

According to some embodiments, a parameter of the feature vector includes one or more of pattern area, number of vertices, an effective side length and an angle between sides.

According to some embodiments, the information of the minimum repeating cell pattern includes an original matrix information, a rotation matrix information and a mirror matrix information.

According to some embodiments, acquiring the information of the minimum repeating cell pattern in the plurality of special cell structure regions includes: converting the minimum repeating cell pattern into a two-dimensional original matrix to acquire the original matrix information of the minimum repeating cell pattern; and performing rotation and mirroring operations on the two-dimensional original matrix to acquire the rotation matrix information and the mirror matrix information of the minimum repeating cell pattern.

According to some embodiments, converting the minimum repeating cell pattern into a two-dimensional original matrix includes: acquiring a minimum coverage region of the minimum repeating cell pattern, wherein the minimum coverage region has a rectangle shape; taking each vertex of the minimum repeating cell pattern as a fixed point, extending to a boundary of the minimum repeating cell pattern along the first direction and the second direction to construct a grid cell; according to a filling situation of the grid cell, replacing each empty grid cell with 0, and replacing each completely filled grid cell with 1 to acquire an initial original matrix represented by 0 and 1, wherein each grid cell of the initial original matrix has a row height and a column width; and acquiring cell values according to the row height and column width of each grid cell of the initial original matrix to acquire the two-dimensional original matrix.

According to some embodiments, the two-dimensional original matrix is m rows by n columns, and the rotation matrix information includes: for any element Aij in an original m×n matrix, a new position after rotation about the origin by 90° is (j, m−i−1), (m−i−1, n−j−1) after rotation by 180°, and (n−j−1, i) after rotation by 270°, and the mirror matrix information includes: for any element Aij in the original m×n matrix, a new position after horizontally mirrored about the origin is (i, n−j+1), and (m−i+1, j) after vertically mirrored.

According to some embodiments, the row height and column width of the grid cell of the original matrix are calculated by: dividing the minimum coverage region into a plurality of sub-columns uniformly along the first direction, wherein several sub-column lines coincide with a contour line of the minimum repeating cell pattern parallel to the second direction; dividing the minimum coverage region into a plurality of sub-rows uniformly along the second direction Y, wherein several sub-row lines coincide with a contour line of the minimum repeating cell pattern parallel to the first direction; calculating a row number of the sub-rows of each column of grid cells in the first direction to acquire the row height of the grid cells; and calculating a column number of the sub-columns of each row of grid cells in the second direction to acquire the column width of the grid cells.

According to some embodiments, two adjacent contour lines of the minimum repeating cell pattern are perpendicular to each other.

According to some embodiments, an angle between two adjacent contour lines of the minimum repeating cell pattern is an obtuse angle or an acute angle, wherein some of the grid cells are partially filled, and an area of a filled part is a value of the two-dimensional original matrix of the grid cells partially filled.

According to some embodiments, acquiring the area of the filled part includes: acquiring the column number of the sub-columns and the row number of the sub-rows corresponding to the grid cells partially filled; and calculating the area of the filled part of the grid cells partially filled according to the column number of the sub-columns and the row number of the sub-rows.

According to some embodiments, acquiring the cell correction pattern corresponding to the minimum repeating cell pattern includes: acquiring the minimum repeating cell pattern according to the special cell structure database; and acquiring the cell correction pattern corresponding to the minimum repeating cell pattern according to the first correction layout.

According to some embodiments, the method further includes, before acquiring the cell correction pattern corresponding to the minimum repeating cell pattern according to the first correction layout: determining whether the minimum repeating cell pattern is located at a boundary of the special cell structure region; and acquiring the cell correction pattern corresponding to the minimum repeating cell pattern according to the first correction layout if the minimum repeating cell pattern is not located at the boundary of the special cell structure region.

According to some embodiments, determining whether the minimum repeating cell pattern is located at a boundary of the special cell structure region includes: taking any one end point of a side of the minimum repeating cell pattern as a second vertex, extending a pre-set length along the first direction and the second direction perpendicular to each other to acquire an extension region, wherein a selection rule of the second vertex is the same as a selection rule of the first vertex; taking the minimum repeating cell pattern as a center, acquiring a number of second vertices around the minimum repeating cell pattern in the extension region; determining that the minimum repeating cell pattern is not located at the boundary of the special cell structure region if the number of the second vertices around the minimum repeating cell pattern in the extension region is greater than or equal to 4; and determining that the minimum repeating cell pattern is located at the boundary of the special cell structure region if the number of the second vertices around the minimum repeating cell pattern in the extension region is less than 4.

According to another aspect of the present disclosure, a special cell general database established by the method according to any one of preceding embodiments is provided.

According to another aspect of the present disclosure, a pattern correction method includes: providing a to-be-corrected layout including a to-be-corrected region and a to-be-corrected special cell structure region; acquiring a to-be-corrected minimum repeating cell pattern in the to-be-corrected special cell structure region; providing a special cell general database established by the method according to any one of preceding embodiments; acquiring an information of a cell correction pattern corresponding to the to-be-corrected minimum repeating cell pattern in the special cell general database; performing an optical proximity correction on the to-be-corrected region to acquire an information of a second correction pattern; and acquiring a correction layout according to the information of the second correction pattern and the information of the cell correction pattern.

According to some embodiments, the pattern correction method further includes, before acquiring the information of the cell correction pattern corresponding to the to-be-corrected minimum repeating cell pattern in the special cell general database: determining whether the to-be-corrected minimum repeating cell pattern is located at a boundary of the to-be-corrected special cell structure region.

According to some embodiments, the pattern correction method further includes: acquiring the correction layout according to the information of the second correction pattern and the information of the cell correction pattern if the to-be-corrected minimum repeating cell pattern is not located at the boundary of the to-be-corrected special cell structure region.

According to some embodiments, the pattern correction method further includes: performing the optical proximity correction on the to-be-corrected minimum repeating cell pattern at the boundary of the to-be-corrected special cell structure region if the to-be-corrected minimum repeating cell pattern is located at the boundary of the to-be-corrected special cell structure region to acquire an information of a third correction pattern; and acquiring the correction layout according to the information of the second correction pattern, the information of the cell correction pattern and the information of the third correction pattern.

The technical solution of the embodiments of the present disclosure has following beneficial effects:

According to the embodiments of the present disclosure, the special cell general database is acquired through the special cell structure database and the special cell correction result database, and the information of the minimum repeating cell pattern in the special cell general database is in one-to-one correspondence with the information of each cell correction pattern, thus, when correcting the to-be-corrected layout, only the to-be-corrected region is corrected, and the correction result of the to-be-corrected special cell structure region can be directly acquired from the special cell general database, so that the calculation time of the optical proximity correction can be saved.

Further, after acquiring the to-be-corrected minimum repeating cell pattern in the to-be-corrected special cell structure region, the method further includes: determining whether the minimum repeating cell pattern is at the boundary of the special cell structure region. If the minimum repeating cell pattern is located at the boundary of the special cell structure region, the optical proximity correction is performed on the minimum repeating cell pattern, thus the accuracy of the optical proximity correction can be improved.

BRIEF DESCRIPTION OF THE DRAWINGS

FIG. 9 to FIG. 21 are schematic structural views illustrating an establishing process of a special cell general database according to an embodiment of the present disclosure.

DETAILED DESCRIPTION OF THE PREFERRED EMBODIMENT

As mentioned in the background, it is necessary to identify and classify special cell regions. The following will analyze and explain specific embodiments of the present disclosure.

Figure 1:
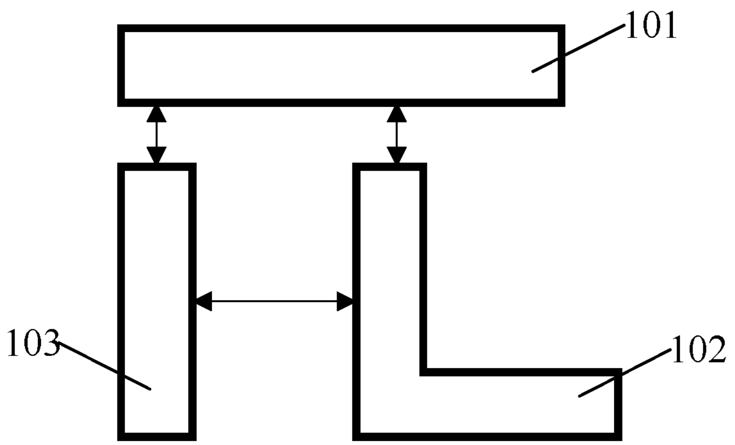
FIG. 1 and FIG. 2 are schematic views illustrating a cell pattern structure according to an embodiment of the present disclosure.
Figure 2:
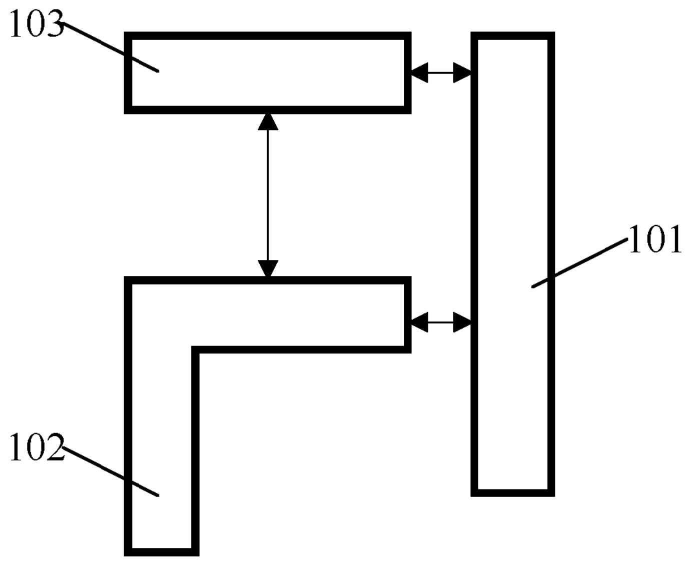

FIGS. 1 and 2 are schematic views illustrating a cell pattern structure according to an embodiment of the present disclosure.

Referring to FIGS. 1 and 2, FIG. 2 is a schematic view illustrating the cell pattern structure rotated by 90 degrees in FIG. 1. The cell pattern structure in FIGS. 1 and 2 includes a first pattern 101, a second pattern 102 and a third pattern 103.

The cell pattern structure in FIG. 1 is the same as the cell pattern structure in FIG. 2, but placements on different layouts are different, thus it is difficult to distinguish whether the pattern structure is rotated or mirrored, so it is impossible to accurately identify a minimum repeating cell in a special cell region.

The embodiments of the present disclosure provide a special cell general database, a method for establishing the special cell general database and a pattern correction method. The special cell general database is acquired through a special cell structure database and a special cell correction result database, and an information of a minimum repeating cell pattern in the special cell general database is in one-to-one correspondence with an information of each cell correction pattern, thus when correcting a to-be-corrected layout, only a to-be-corrected region is corrected, and a correction result of a to-be-corrected special cell structure region can be directly acquired from the special cell general database, thereby reducing a calculation time of an optical proximity correction.

In order to make above purposes, features and beneficial effects of the present disclosure more obvious and understandable, specific embodiments of the present disclosure are described in detail below in combination with the accompanying drawings.

FIG. 3 to FIG. 7 are flowcharts illustrating a method for establishing a special cell general database for pattern correction according to an embodiment of the present disclosure.

Figure 3:
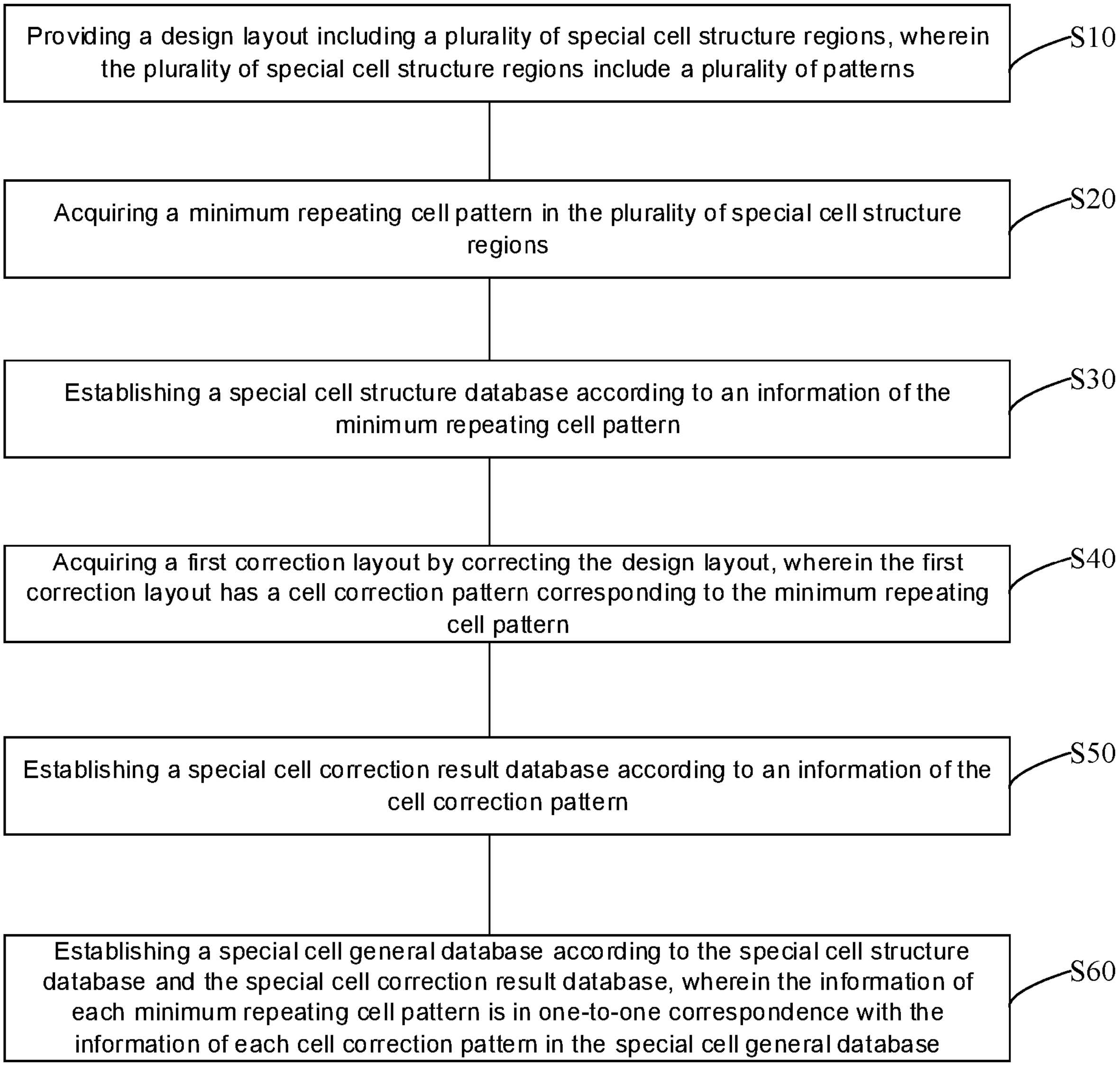
FIG. 3 to FIG. 7 are flowcharts illustrating a method for establishing a special cell general database for pattern correction according to an embodiment of the present disclosure.

Referring to FIG. 3, the method for establishing the special cell general database for pattern correction includes:

S10. providing a design layout including a plurality of special cell structure regions, wherein the plurality of special cell structure regions include a plurality of patterns;

S20. acquiring a minimum repeating cell pattern in the plurality of special cell structure regions;

S30. establishing a special cell structure database according to an information of the minimum repeating cell pattern;

S40. acquiring a first correction layout by correcting the design layout, wherein the first correction layout has a cell correction pattern corresponding to the minimum repeating cell pattern;

S50. establishing a special cell correction result database according to an information of the cell correction pattern; and S60. establishing the special cell general database according to the special cell structure database and the special cell correction result database, wherein the information of each minimum repeating cell pattern is in one-to-one correspondence with the information of each cell correction pattern in the special cell general database.

According to the embodiments of the present disclosure, the special cell general database is acquired through the special cell structure database and the special cell correction result database, and the information of the minimum repeating cell pattern in the special cell general database is in one-to-one correspondence with the information of each cell correction pattern, thus when correcting the to-be-corrected layout, only the to-be-corrected region is corrected, and the correction result of the to-be-corrected special cell structure region can be directly acquired from the special cell general database, thereby reducing the calculation time of the optical proximity correction.

Next, each step will be explained separately.

Still referring to FIG. 3, S10 is performed: providing a design layout including a plurality of special cell structure regions, wherein the plurality of special cell structure regions include a plurality of patterns.

The special cell structure region has several repeating cell patterns, such as a storage cell of a dynamic random-access memory (SRAM) and a pixel cell of a pixel structure.

Still referring to FIG. 3, S20 is performed: acquiring a minimum repeating cell pattern in the plurality of special cell structure regions.

Figure 4:
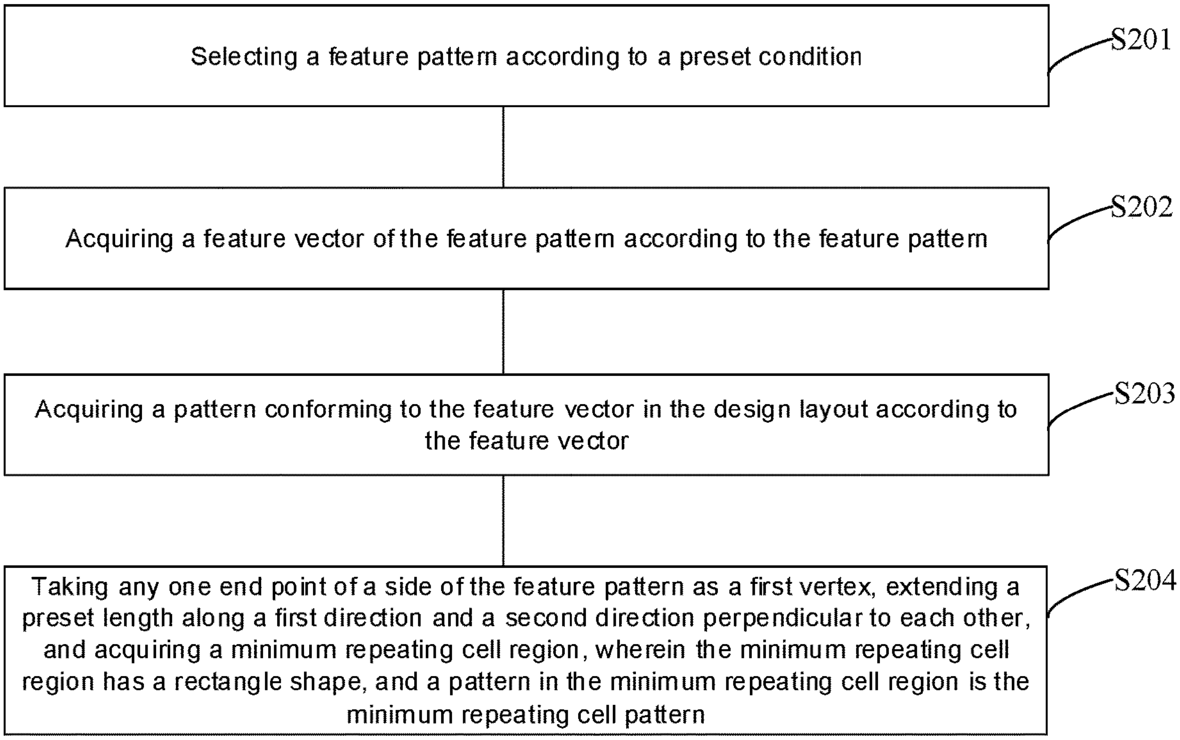

Referring to FIG. 4, in some embodiments, acquiring the minimum repeating cell pattern in the plurality of special cell structure regions includes:

S201. selecting a feature pattern according to a preset condition;

S202. acquiring a feature vector of the feature pattern according to the feature pattern;

S203. acquiring a pattern conforming to the feature vector in the design layout according to the feature vector; and S204. taking any one end point of a side of the feature pattern as a first vertex, extending a preset length along a first direction and a second direction perpendicular to each other, and acquiring a minimum repeating cell region, wherein the minimum repeating cell region has a rectangle shape, and a pattern in the minimum repeating cell region is the minimum repeating cell pattern.

Still referring to FIG. 4, S201 is performed: selecting a feature pattern according to a preset condition.

In some embodiments, the preset conditions include: a number of sides of the feature pattern is greater than or equal to 6.

When several patterns in the special cell structure region meet the condition that the number of sides is greater than or equal to 6, these patterns can be recognized as feature patterns.

The preset conditions mentioned can be formulated based on actual situation of a semiconductor structure.

Figure 9:
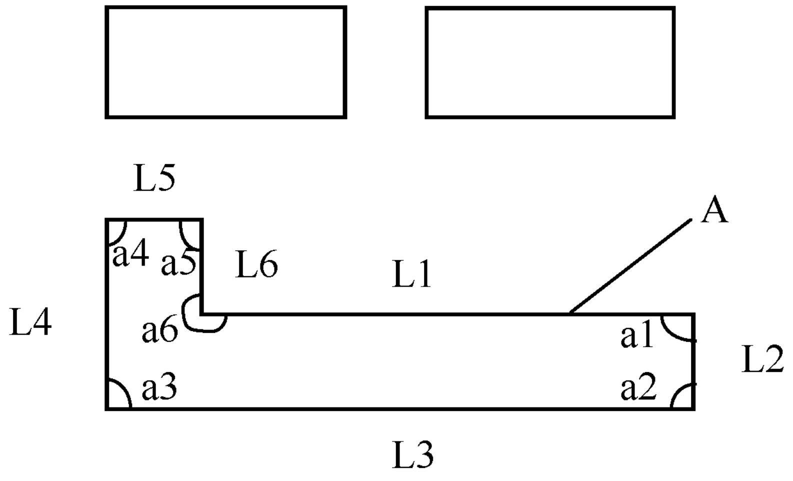

Referring to FIG. 9, FIG. 9 is a schematic view illustrating a feature pattern A with six sides L1, L2, L3, L4, L5, and L6.

Still referring to FIG. 4, S202 is performed: acquiring a feature vector of the feature pattern according to the feature pattern.

In some embodiments, a parameter of the feature vector includes one or more of a pattern area, a number of vertices, an effective side length and an angle between sides.

Still referring to FIG. 9, the parameters of the feature vector of the feature pattern A include the effective side length and the angle between two adjacent sides. The feature vector is [L1, a1, L2, a2, L3, a3, L4, a4, L5, a5, L6, a6], where a1 is an angle between L1 and L2, a2 is an angle between L2 and L3, a3 is an angle between L3 and L4, a4 is an angle between L4 and L5, a5 is an angle between L5 and L6, and a6 is an angle between L6 and L1.

Still referring to FIG. 4, S203 is performed: acquiring a pattern conforming to the feature vector in the design layout according to the feature vector.

The feature vectors of different patterns are different. When the feature vectors of two patterns are the same, the two patterns are the same.

Still referring to FIG. 4, S204 is performed: taking any one end point of a side of the feature pattern as a first vertex, extending a preset length along a first direction and a second direction perpendicular to each other, and acquiring a minimum repeating cell region, wherein the minimum repeating cell region has a rectangle shape, and a pattern in the minimum repeating cell region is the minimum repeating cell pattern.

Figure 10:
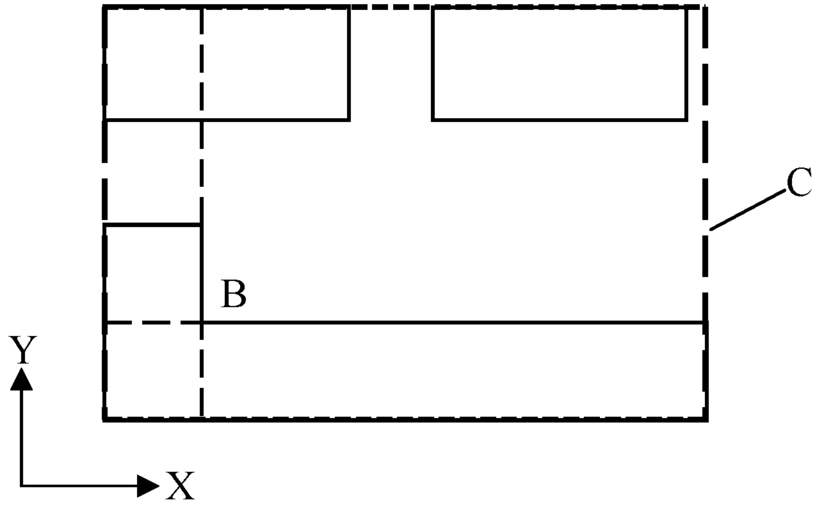

Referring to FIG. 10, FIG. 10 is a schematic view illustrating a minimum repeating cell region C. In some embodiments, a left end point B of L1 is selected as the vertex, and a certain preset length is extended along the first direction X and the second direction Y perpendicular to each other to form an expanded rectangular region C. The expanded rectangular region C is the minimum repeating cell region C. The feature pattern A is located within the minimum repeating cell region C.

The preset length extending along the first direction X and the second direction Y may be set according to different special cell structures.

Still referring to FIG. 3, S30 is performed: establishing a special cell structure database according to an information of the minimum repeating cell pattern.

In some embodiments, the information of the minimum repeating cell pattern includes an original matrix information, a rotation matrix information and a mirror matrix information.

Figure 5:
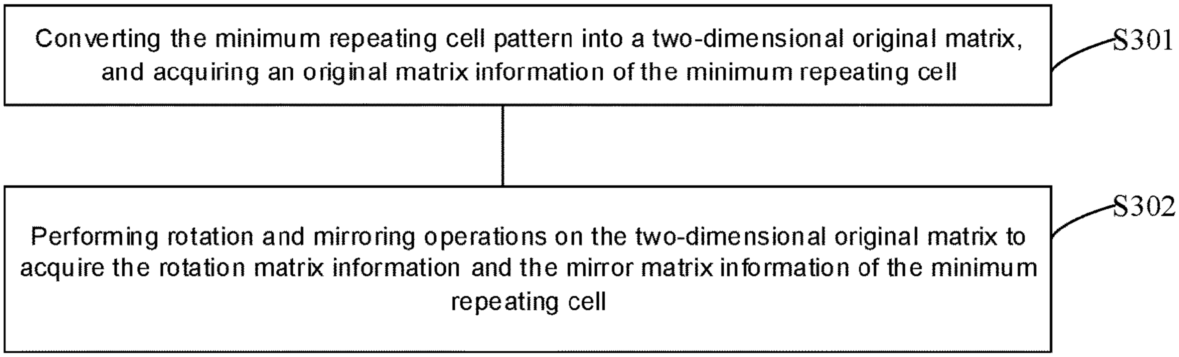

Referring to FIG. 5, in some embodiments, the method for acquiring the information of the minimum repeating cell pattern in the plurality of special cell structure regions includes:

S301. converting the minimum repeating cell pattern into a two-dimensional original matrix, and acquiring an original matrix information of the minimum repeating cell;

S302. performing rotation and mirroring operations on the two-dimensional original matrix to acquire the rotation matrix information and the mirror matrix information of the minimum repeating cell.

Still referring to FIG. 5, S301 is performed: converting the minimum repeating cell pattern into a two-dimensional original matrix, and acquiring an original matrix information of the minimum repeating cell.

Figure 6:
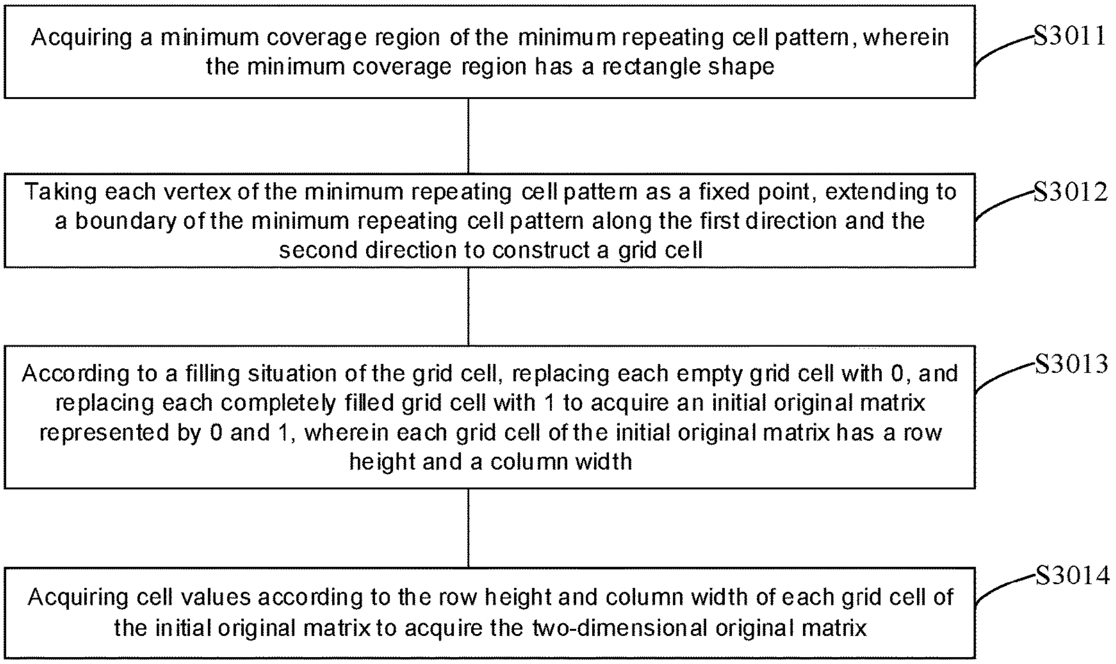

Referring to FIG. 6, in some embodiments, the method for converting the minimum repeating cell pattern into a two-dimensional original matrix includes:

S3011. acquiring a minimum coverage region of the minimum repeating cell pattern, wherein the minimum coverage region has a rectangle shape;

S3012. taking each vertex of the minimum repeating cell pattern as a fixed point, extending to a boundary of the minimum repeating cell pattern along the first direction and the second direction to construct a grid cell;

S3013. according to a filling situation of the grid cell, replacing each empty grid cell with 0, and replacing each completely filled grid cell with 1 to acquire an initial original matrix represented by 0 and 1, wherein each grid cell of the initial original matrix has a row height and a column width;

S3014. acquiring cell values according to the row height and column width of each grid cell of the initial original matrix to acquire the two-dimensional original matrix.

Still referring to FIG. 6, S3011 is performed: acquiring a minimum coverage region of the minimum repeating cell pattern, wherein the minimum coverage region has a rectangle shape.

The minimum repeating cell pattern is located within the minimum coverage region, and the boundary of the minimum coverage region coincides with the boundary of the minimum repeating cell pattern.

Figure 11:
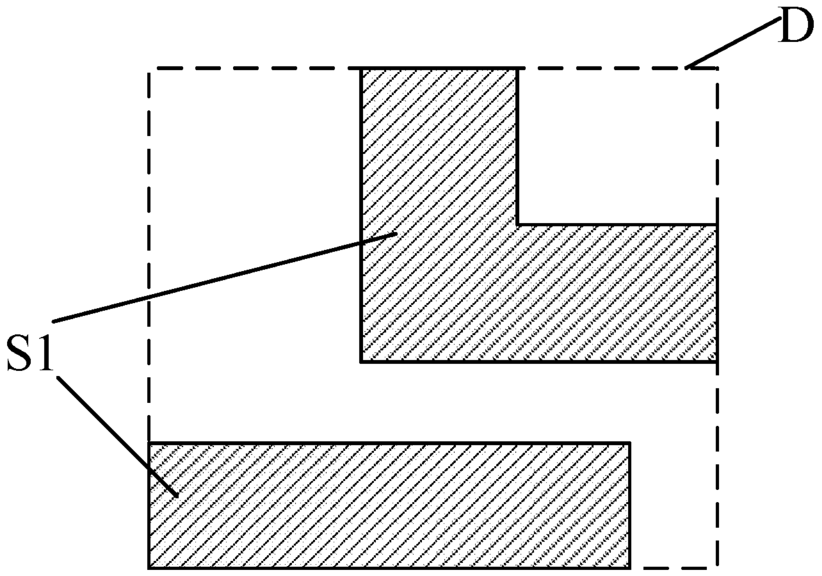

Referring to FIG. 11, in some embodiments, the minimum coverage region of the minimum repeating cell pattern S1 is D.

Still referring to FIG. 6, S3012 is performed: taking each vertex of the minimum repeating cell pattern as a fixed point, extending to a boundary of the minimum repeating cell pattern along the first direction and the second direction to construct a grid cell.

Figure 12:
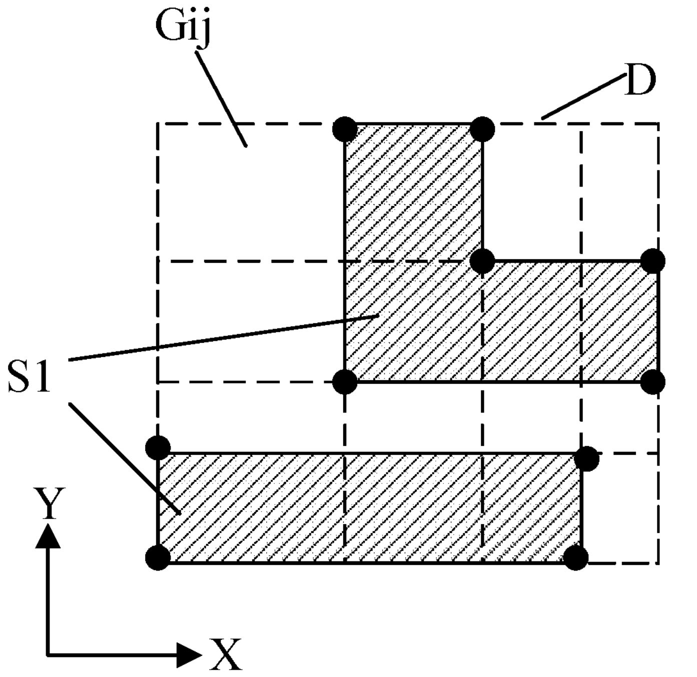

Referring to FIG. 12, in some embodiments, each vertex of the minimum repeating cell pattern S1 is taken as a fixed point to extend to the boundary of the minimum repeating cell pattern S1 along the first direction X and the second direction Y to construct several grid cells Gij.

In some embodiments, two adjacent contour lines of the minimum repeating cell pattern S1 are perpendicular to each other.

Still referring to FIG. 6, S3013 is performed: according to a filling situation of the grid cell, replacing each empty grid cell with 0, and replacing each completely filled grid cell with 1 to acquire an initial original matrix represented by 0 and 1, wherein each grid cell of the initial original matrix has a row height and a column width.

The row height and the column width of the grid cell of the initial original matrix are calculated by: dividing the minimum coverage region D into a plurality of sub-columns uniformly along the first direction X, wherein several sub-column lines coincide with the contour line of the minimum repeating cell pattern S1 parallel to the second direction Y; dividing the minimum coverage region D into a plurality of sub-rows uniformly along the second direction Y, wherein several sub-row lines coincide with the contour line of the minimum repeating cell pattern S1 parallel to the first direction X; calculating a row number of the sub-rows of each column of grid cells in the first direction X to acquire the row height of the grid cells; and calculating a column number of the sub-columns of each row of grid cells in the second direction Y to acquire the column width of the grid cells.

Figure 13:
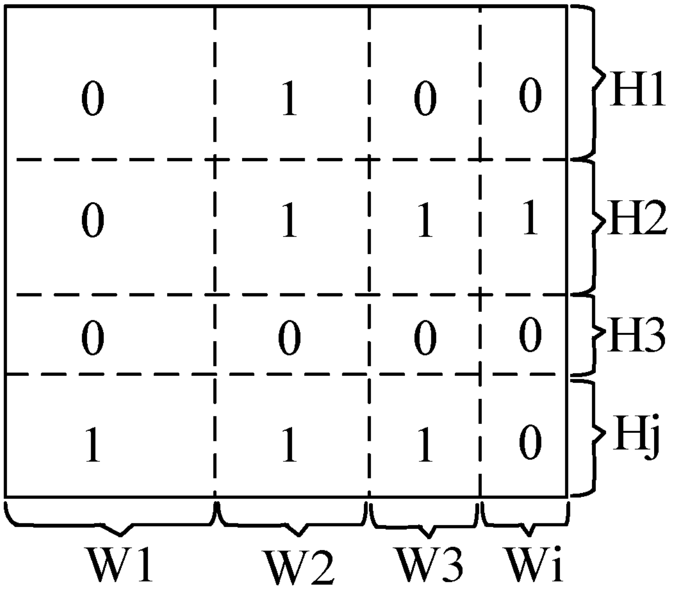

Referring to FIG. 13, in some embodiments, each grid cell Gij of the initial original matrix has a row height Wi and a column width Hj.

In some embodiments, the values of the initial original matrix obtained based on the filling situation of the grid cells Gij are: G11=0, G12=0, G13=0, G14=1, G21=1, G22=1, G23=0, G24=1, G31=0, G32=1, G33=0, G34=1, G41=0, G42=1, G43=0, G44=0.

Still referring to FIG. 6, S3014 is performed: acquiring cell values according to the row height and column width of each grid cell of the initial original matrix to acquire the two-dimensional original matrix.

The value taking method of the two-dimensional original matrix includes: the cell value of the grid cell Gij=0 is 0, and the cell value of the grid cell Gij=1 is row high Wi×column width Hj.

Figure 14:
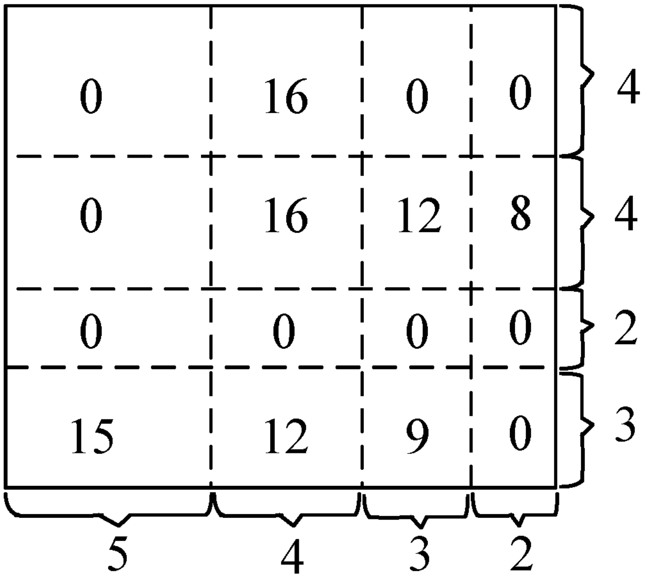

Referring to FIG. 14, FIG. 14 is a schematic view based on FIG. 13. In some embodiments, W1=5, W2=4, W3=3, W4=2, H1=4, H2=4, H3=2, H4=3.

The values of the two-dimensional original matrix are: G11=0, G12=0, G13=0, G14=W1×H4=15, G21=W2×H1=16, G22=W2×H2=16, G23=0, G24=W2×H4=12, G31=0, G32=W3×H2=12, G33=0, G34=W3×H4=9, G41=0, G42=W4×H2=8, G43=0, G44=0.

In some embodiments, when the angle between two adjacent contour lines of the minimum repeating cell pattern is obtuse or acute, there will be partially filled grid cells in the grid cells. At this time, an area of the filled part in the partially filled grid cells is obtained, which is the value of the two-dimensional original matrix of the partially filled grid cells.

In some embodiments, acquiring the area of the filled part includes: acquiring the column number of the sub-columns and the row number of the sub-rows corresponding to the partially filled grid cells and calculating the area of the filled part of the partially filled grid cells according to the column number of the sub-columns and the row number of the sub-rows.

Still referring to FIG. 5, S302 is performed: performing rotation and mirroring operations on the two-dimensional original matrix to acquire the rotation matrix information and the mirror matrix information of the minimum repeating cell.

In some embodiments, it is assumed that the two-dimensional original matrix is m rows×n columns, and the rotation matrix information includes: for any element Aij in an original m×n matrix, a new position after rotation about the origin by 90° is (j, m−i−1), (m−i−1, n−j−1) after rotation by 180°, and (n−j−1, i) after rotation by 270°.

Referring to FIGS. 15 to 18, FIG. 15 shows the two-dimensional original matrix, FIG. 16 shows the two-dimensional original matrix rotated clockwise by 90° in FIG. 15, FIG. 17 shows the two-dimensional original matrix rotated clockwise by 180° in FIG. 15, and FIG. 18 shows the two-dimensional original matrix rotated clockwise by 270° in FIG. 15.

The mirror matrix information includes: for any element Aij in the original m×n matrix, a new position after horizontally mirrored about the origin is (i, n−j+1), and after vertically mirrored.

Referring to FIGS. 15, 19 and 20, FIG. 19 shows a vertical mirrored two-dimensional original matrix in FIG. 15, and FIG. 20 shows a horizontal mirrored two-dimensional original matrix in FIG. 15.

Still referring to FIG. 3, before performing S40, the method includes S70: determining whether the minimum repeating cell pattern is located at the boundary of the special cell structure region.

If the minimum repeating cell pattern is not located at the boundary of the special cell structure region, the cell correction pattern corresponding to the minimum repeating cell pattern is acquired according to the first correction layout.

Figure 7:
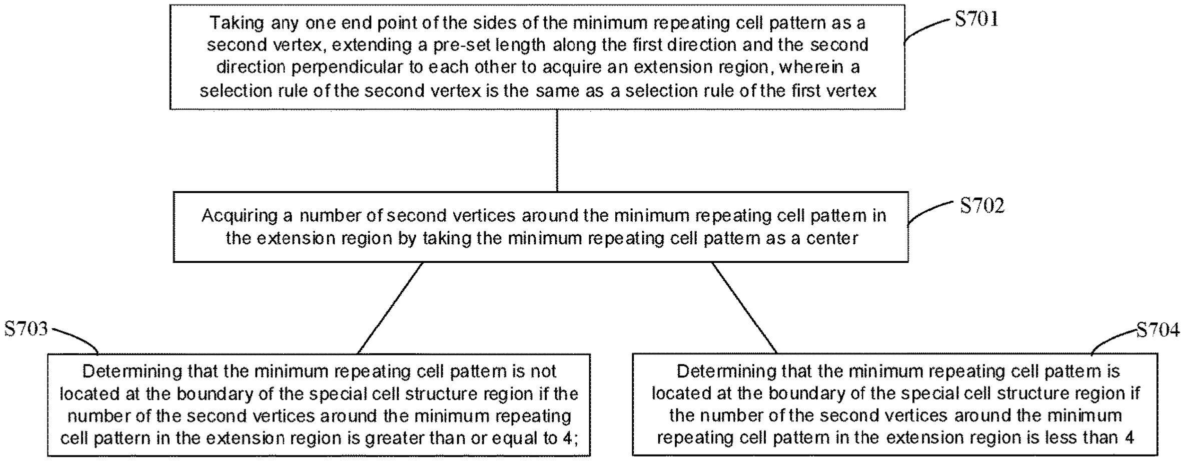

Referring to FIG. 7, in some embodiments, the method for determining whether the minimum repeating cell pattern is located at the boundary of the special cell structure region includes:

S701. taking any one end point of the sides of the minimum repeating cell pattern as a second vertex, extending a pre-set length along the first direction and the second direction perpendicular to each other to acquire an extension region, wherein a selection rule of the second vertex is the same as a selection rule of the first vertex;

S702. acquiring a number of second vertices around the minimum repeating cell pattern in the extension region by taking the minimum repeating cell pattern as a center;

S703. determining that the minimum repeating cell pattern is not located at the boundary of the special cell structure region if the number of the second vertices around the minimum repeating cell pattern in the extension region is greater than or equal to 4; and S704. determining that the minimum repeating cell pattern is located at the boundary of the special cell structure region if the number of the second vertices around the minimum repeating cell pattern in the extension region is less than 4.

Figure 21:
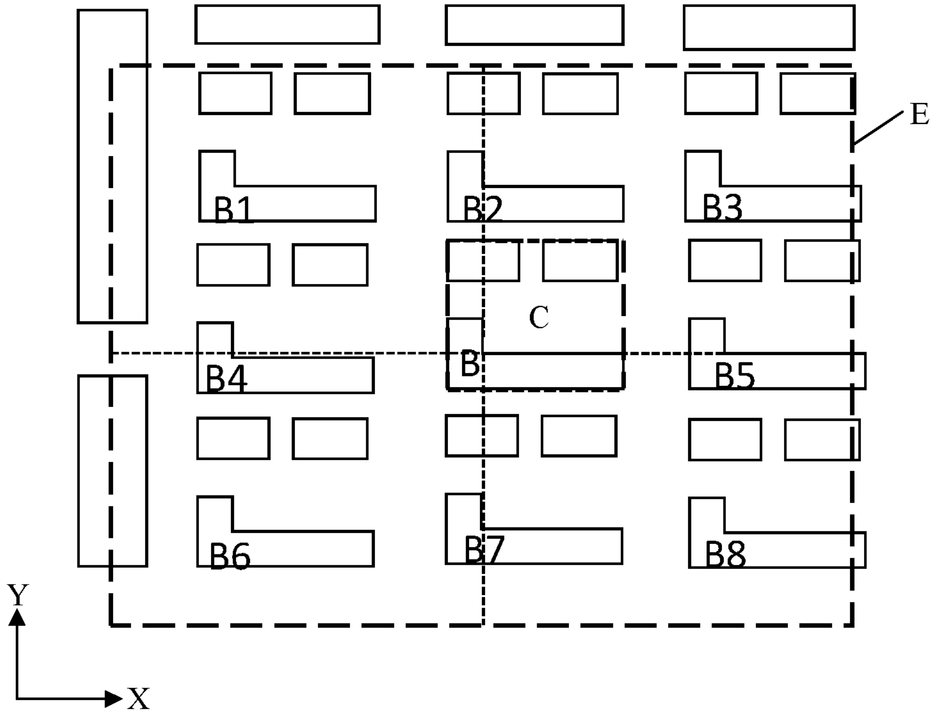

Referring to FIG. 21, FIG. 21 is a schematic view for determining whether the minimum repeating cell pattern is located at the boundary of the special cell structure region. Taking the minimum repeating cell region C as an example, the minimum repeating cell pattern is located in the minimum repeating cell region C. Using either end point B of the side of the minimum repeating cell pattern as the second vertex, the preset length is extended along the first direction X and the second direction Y perpendicular to each other to acquire an extension region E. The number of the second vertices around the minimum repeating cell region C in the expanded region E is acquired by taking the minimum repeating cell region C as the center.

In some embodiments, the preset length extended along the first direction X and the second direction Y perpendicular to each other is 1 to 2 times of the length or width of the minimum repeating cell region C.

In FIG. 21, B1 to B8 are all the second vertices.

Still referring to FIG. 3, S40 is performed: acquiring a first correction layout acquired by correcting the design layout, wherein the first correction layout has a cell correction pattern corresponding to the minimum repeating cell pattern.

The first correction layout can be acquired by performing optical proximity correction on the design layout, and the cell correction patterns in the minimum repeating cell correspond to the minimum repeating cell patterns one by one.

The method for acquiring the cell correction patterns corresponding to the minimum repeating cell patterns includes: acquiring the minimum repeating cell pattern according to the special cell structure database; and acquiring the cell correction pattern corresponding to the minimum repeating cell pattern according to the first correction pattern.

Still referring to FIG. 3, S50 is performed: establishing a special cell correction result database according to an information of the cell correction pattern.

The information of the cell correction pattern includes a corresponding relationship with the minimum repeating cell pattern.

Still referring to FIG. 3, S60 is performed: establishing the special cell general database according to the special cell structure database and the special cell correction result database, wherein the information of each minimum repeating cell pattern is in one-to-one correspondence with the information of each cell correction pattern in the special cell general database.

The special cell general database includes the information of the special cell structure database and the information of the special cell correction result database, and the information of each minimum repeating cell pattern is in one-to-one correspondence with the information of each cell correction pattern in the special cell general database, thus when correcting the to-be-corrected layout, only the to-be-corrected region is corrected, and the correction result of the to-be-corrected special cell structure region can be directly acquired from the special cell general database, so that the calculation time of optical proximity correction can be saved.

Correspondingly, the embodiments of the present disclosure also provide a special cell general database established by the method as shown in FIGS. 3 to 7.

Figure 8:
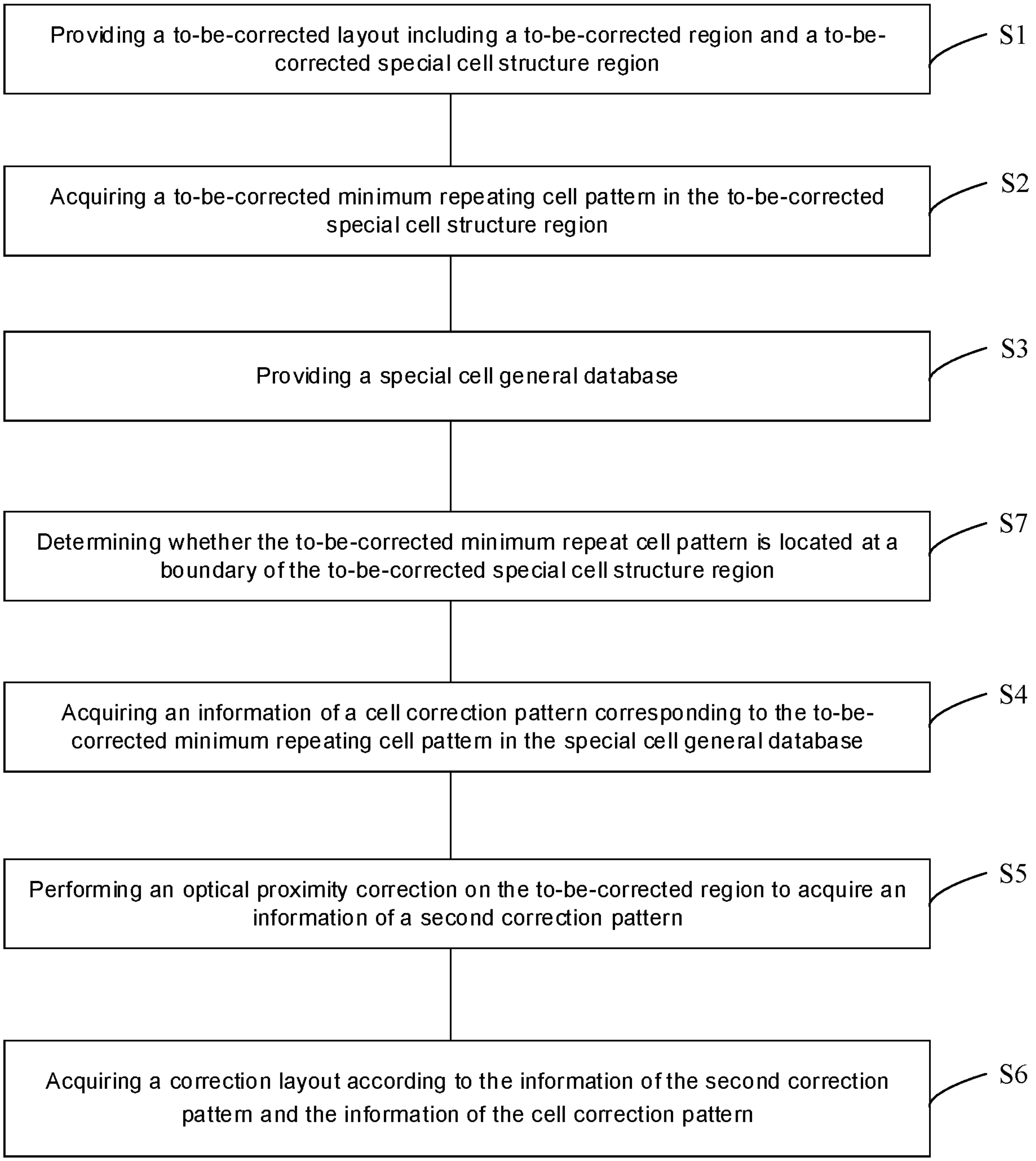
FIG. 8 is a flowchart illustrating a pattern correction method according to an embodiment of the present disclosure.

FIG. 8 is a flowchart illustrating a pattern correction method according to an embodiment of the present disclosure.

Referring to FIG. 8, the pattern correction method includes:

S1. providing a to-be-corrected layout including a to-be-corrected region and a to-be-corrected special cell structure region;

S2. acquiring a to-be-corrected minimum repeating cell pattern in the to-be-corrected special cell structure region;

S3. providing a special cell general database established by the method as shown in FIGS. 3 to 7;

S4. acquiring an information of a cell correction pattern corresponding to the to-be-corrected minimum repeating cell pattern in the special cell general database;

S5. performing an optical proximity correction on the to-be-corrected region to acquire an information of a second correction pattern;

S6. acquiring a correction layout according to the information of the second correction pattern and the information of the cell correction pattern.

The special cell general database is acquired through the special cell structure database and the special cell correction result database, and the information of the minimum repeating cell pattern in the special cell general database is in one-to-one correspondence with the information of each cell correction pattern, thus when correcting the to-be-corrected layout, only the to-be-corrected region is corrected, and the correction result of the to-be-corrected special cell structure region can be directly acquired from the special cell general database, so that the calculation time of optical proximity correction can be saved.

Next, each step is analyzed and explained.

Still referring to FIG. 8, S1 is performed: providing a to-be-corrected layout including a to-be-corrected region and a to-be-corrected special cell structure region.

The to-be-corrected special structure region has several to-be-corrected repeating cell patterns, such as a storage cell of a dynamic random-access memory and a pixel cell of a pixel structure. The to-be-corrected region is a pattern region that requires optical proximity correction.

Still referring to FIG. 8, S2 is performed: acquiring a to-be-corrected minimum repeating cell pattern in the to-be-corrected special cell structure region.

The process of acquiring the to-be-corrected minimum repeating cell pattern in the to-be-corrected special cell structure region is described with reference to FIG. 2, which will not be repeated herein.

Still referring to FIG. 8, S3 is performed: providing a special cell general database established by the method as shown in FIG. 7.

Before acquiring the information of the cell correction pattern corresponding to the to-be-corrected minimum repeating cell pattern in the special cell general database, the method further includes S7: determining whether the to-be-corrected minimum repeat cell pattern is located at a boundary of the to-be-corrected special cell structure region.

If the to-be-corrected minimum repeating cell pattern is not located at the boundary of the to-be-corrected special cell structure region, the information of the cell correction pattern corresponding to the to-be-corrected minimum repeating cell pattern may be acquired in the special cell general database.

If the to-be-corrected minimum repeating cell pattern is located at the boundary of the to-be-corrected special cell structure region, the to-be-corrected minimum repeating cell pattern located at the boundary of the to-be-corrected special cell structure region may be separately corrected.

Determining whether the to-be-corrected minimum repeating cell pattern is located at the boundary of the to-be-corrected special cell structure region can improve the accuracy of optical proximity correction.

The method for determining whether the to-be-corrected minimum repeating cell pattern is located at the boundary of the to-be-corrected special cell structure region is described with reference to FIG. 7, which will not be repeated herein.

Still referring to FIG. 8, S4 is performed: acquiring an information of a cell correction pattern corresponding to the to-be-corrected minimum repeating cell pattern in the special cell general database.

In the special cell general database, the information of the minimum repeating cell patterns correspond to the information of the cell correction patterns one by one. The to-be-corrected minimum repeating cell pattern also has the information of corresponding cell correction pattern.

Still referring to FIG. 8, S5 is performed: performing an optical proximity correction on the to-be-corrected region and acquiring an information of a second correction pattern.

Only the to-be-corrected region needs to be corrected, and the correction results of the to-be-corrected special cell structure region can be directly acquired from the special cell general database, thus the calculation time of optical proximity correction can be saved.

Still referring to FIG. 8, S6 is performed: acquiring a correction layout according to the information of the second correction pattern and the information of the cell correction pattern.

The correction layout includes the information of the second correction pattern after correcting the to-be-corrected region, and the information of the cell correction pattern after correcting the to-be-corrected special cell structure region.

In some embodiments, if the to-be-corrected minimum repeating cell pattern is located at the boundary of the special cell structure region, the optical proximity correction is performed on the to-be-corrected minimum repeating cell pattern at the boundary of the special cell structure region to acquire an information of a third correction pattern; and the correction layout may be acquired according to the information of the second correction pattern, the information of the cell correction pattern and the information of the third correction pattern.

Individually correcting the to-be-corrected minimum repeating cell pattern at the boundary of the special cell structure region can improve the accuracy of optical proximity correction.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A method for establishing a special cell general database for pattern correction, comprising:

providing a design layout comprising a plurality of special cell structure regions, wherein the plurality of special cell structure regions comprise a plurality of patterns;

acquiring a minimum repeating cell pattern in the plurality of special cell structure regions;

establishing a special cell structure database according to an information of the minimum repeating cell pattern;

acquiring a first correction layout by correcting the design layout, wherein the first correction layout has a cell correction pattern corresponding to the minimum repeating cell pattern;

establishing a special cell correction result database according to an information of the cell correction pattern; and establishing the special cell general database according to the special cell structure database and the special cell correction result database, wherein the information of each minimum repeating cell pattern is in one-to-one correspondence with the information of each cell correction pattern in the special cell general database.

2. The method according to claim 1, wherein acquiring a minimum repeating cell pattern in the plurality of special cell structure regions comprises:

selecting a feature pattern according to a preset condition;

acquiring a feature vector of the feature pattern according to the feature pattern;

acquiring a pattern conforming to the feature vector in the design layout according to the feature vector; and taking any one end point of a side of the feature pattern as a first vertex, and extending a preset length along a first direction and a second direction perpendicular to each other to acquire a minimum repeating cell region, wherein the minimum repeating cell region has a rectangle shape, and a pattern in the minimum repeating cell region is the minimum repeating cell pattern.

3. The method according to claim 2, wherein the preset condition comprises: a number of sides of the feature pattern is greater than or equal to 6.

4. The method according to claim 2, wherein a parameter of the feature vector comprises one or more of a pattern area, a number of vertices, an effective side length and an angle between sides.

5. The method according to claim 2, wherein the information of the minimum repeating cell pattern comprises an original matrix information, a rotation matrix information and a mirror matrix information.

6. The method according to claim 5, wherein acquiring the information of the minimum repeating cell pattern in the plurality of special cell structure regions comprises:

converting the minimum repeating cell pattern into a two-dimensional original matrix to acquire the original matrix information of the minimum repeating cell pattern; and performing rotation and mirroring operations on the two-dimensional original matrix to acquire the rotation matrix information and the mirror matrix information of the minimum repeating cell pattern.

7. The method according to claim 6, wherein converting the minimum repeating cell pattern into a two-dimensional original matrix comprises:

acquiring a minimum coverage region of the minimum repeating cell pattern, wherein the minimum coverage region has a rectangle shape;

taking each vertex of the minimum repeating cell pattern as a fixed point, extending to a boundary of the minimum repeating cell pattern along the first direction and the second direction to construct a grid cell;

according to a filling situation of the grid cell, replacing each empty grid cell with 0, and replacing each completely filled grid cell with 1 to acquire an initial original matrix represented by 0 and 1, wherein each grid cell of the initial original matrix has a row height and a column width; and acquiring cell values according to the row height and the column width of each grid cell of the initial original matrix to acquire the two-dimensional original matrix.

8. The method according to claim 7, wherein the two-dimensional original matrix is m rows by n columns, and the rotation matrix information comprises: for any element Aij in an original m×n matrix, a new position after rotation about the origin by 90° is (j, m−i−1), (m−i−1, n−j−1) after rotation by 180°, and (n−j−1, i) after rotation by 270°, and the mirror matrix information comprises: for any element Aij in the original m×n matrix, a new position after horizontally mirrored about the origin is (i, n−j+1), and (m−i+1, j) after vertically mirrored.

9. The method according to claim 7, wherein the row height and the column width of the grid cell of the original matrix are calculated by:

dividing the minimum coverage region into a plurality of sub-columns uniformly along the first direction, wherein several sub-column lines coincide with a contour line of the minimum repeating cell pattern parallel to the second direction;

dividing the minimum coverage region into a plurality of sub-rows uniformly along the second direction Y, wherein several sub-row lines coincide with a contour line of the minimum repeating cell pattern parallel to the first direction;

calculating a row number of the sub-rows of each column of grid cells in the first direction to acquire the row height of the grid cells;

calculating a column number of the sub-columns of each row of grid cells in the second direction to acquire the column width of the grid cells.

10. The method according to claim 9, wherein two adjacent contour lines of the minimum repeating cell pattern are perpendicular to each other.

11. The method according to claim 9, wherein an angle between two adjacent contour lines of the minimum repeating cell pattern is an obtuse angle or an acute angle, wherein some of the grid cells are partially filled, and an area of a filled part is a value of the two-dimensional original matrix of the grid cells partially filled.

12. The method according to claim 11, wherein acquiring the area of the filled part comprises:

acquiring the column number of the sub-columns and the row number of the sub-rows corresponding to the grid cells partially filled; and calculating the area of the filled part of the grid cells partially filled according to the column number of the sub-columns and the row number of the sub-rows.

13. The method according to claim 1, wherein acquiring the cell correction pattern corresponding to the minimum repeating cell pattern comprises:

acquiring the minimum repeating cell pattern according to the special cell structure database; and acquiring the cell correction pattern corresponding to the minimum repeating cell pattern according to the first correction layout.

14. The method according to claim 13, further comprising, before acquiring the cell correction pattern corresponding to the minimum repeating cell pattern according to the first correction layout: determining whether the minimum repeating cell pattern is located at a boundary of the special cell structure region; and acquiring the cell correction pattern corresponding to the minimum repeating cell pattern according to the first correction layout if the minimum repeating cell pattern is not located at the boundary of the special cell structure region.

15. The method according to claim 14, wherein determining whether the minimum repeating cell pattern is located at a boundary of the special cell structure region comprises:

taking any one end point of a side of the minimum repeating cell pattern as a second vertex, extending a pre-set length along the first direction and the second direction perpendicular to each other to acquire an extension region, wherein a selection rule of the second vertex is the same as a selection rule of the first vertex;

taking the minimum repeating cell pattern as a center, acquiring a number of second vertices around the minimum repeating cell pattern in the extension region;

determining that the minimum repeating cell pattern is not located at the boundary of the special cell structure region if the number of the second vertices around the minimum repeating cell pattern in the extension region is greater than or equal to 4; and determining that the minimum repeating cell pattern is located at the boundary of the special cell structure region if the number of the second vertices around the minimum repeating cell pattern in the extension region is less than 4.

16. A special cell general database established by the method according to claim 1.

17. A pattern correction method, comprising:

providing a to-be-corrected layout comprising a to-be-corrected region and a to-be-corrected special cell structure region;

acquiring a to-be-corrected minimum repeating cell pattern in the to-be-corrected special cell structure region;

providing a special cell general database established by the method according to claim 1;

acquiring an information of a cell correction pattern corresponding to the to-be-corrected minimum repeating cell pattern in the special cell general database;

performing an optical proximity correction on the to-be-corrected region to acquire an information of a second correction pattern; and acquiring a correction layout according to the information of the second correction pattern and the information of the cell correction pattern.

18. The pattern correction method according to claim 17, further comprising, before acquiring the information of the cell correction pattern corresponding to the to-be-corrected minimum repeating cell pattern in the special cell general database: determining whether the to-be-corrected minimum repeating cell pattern is located at a boundary of the to-be-corrected special cell structure region.

19. The pattern correction method according to claim 17, further comprising:

acquiring the correction layout according to the information of the second correction pattern and the information of the cell correction pattern if the to-be-corrected minimum repeating cell pattern is not located at the boundary of the to-be-corrected special cell structure region.

20. The pattern correction method according to claim 18, further comprising:

performing the optical proximity correction on the to-be-corrected minimum repeating cell pattern at the boundary of the to-be-corrected special cell structure region if the to-be-corrected minimum repeating cell pattern is located at the boundary of the to-be-corrected special cell structure region to acquire an information of a third correction pattern; and acquiring the correction layout according to the information of the second correction pattern, the information of the cell correction pattern and the information of the third correction pattern.

* * * * *